(12) United States Patent
Resende De Almeida et al.

(10) Patent No.: US 11,939,865 B2
(45) Date of Patent: Mar. 26, 2024

(54) METHOD FOR THE IDENTIFICATION OF OPERATIONAL PROBLEMS IN WELLS THAT PRODUCE BY GAS-LIFT

(71) Applicant: Petróleo Brasileiro S.A.—Petrobras, Rio de Janeiro (BR)

(72) Inventors: Alcino Resende De Almeida, Rio de Janeiro (BR); Andre Leal Gaio, Macaé (BR); Danielle Aguiar De Araujo, Vitória (BR); Maria Aparecida De Melo, Rio de Janeiro (BR); Hercilio De Angeli Honorato, Rio de Janeiro (BR); Cicero Pereira De Carvalho Neto, Macaé (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/792,139

(22) PCT Filed: Dec. 14, 2020

(86) PCT No.: PCT/BR2020/050543
§ 371 (c)(1),
(2) Date: Jul. 11, 2022

(87) PCT Pub. No.: WO2021/119784
PCT Pub. Date: Jun. 24, 2021

(65) Prior Publication Data
US 2023/0134816 A1 May 4, 2023

(30) Foreign Application Priority Data

Dec. 18, 2019 (BR) ...................... 10 2019 027099 3

(51) Int. Cl.
*E21B 43/12* (2006.01)
*E21B 49/08* (2006.01)
(Continued)

(52) U.S. Cl.
CPC .......... *E21B 49/081* (2013.01); *E21B 43/122* (2013.01); *G01M 3/22* (2013.01); *E21B 47/117* (2020.05)

(58) Field of Classification Search
CPC .... E21B 49/081; E21B 43/122; E21B 47/117; G01M 3/22
See application file for complete search history.

(56) References Cited

U.S. PATENT DOCUMENTS 4,646,832 A * 3/1987 Richardson ............. E21B 47/11
436/28
4,972,704 A 11/1990 Wellington et al.
(Continued)

FOREIGN PATENT DOCUMENTS

BR 0804625-5 6/2021
WO 2021119784 A1 6/2021

*Primary Examiner* — Taras P Bemko
(74) *Attorney, Agent, or Firm* — ARENTFOX SCHIFF LLP

(57) ABSTRACT

A method for the identification of operational problems in wells that produce by gas-lift, including allowing the hydrodynamic evaluation of the well/lines set by injection of at least one alcohol in the gas-lift line, collecting samples at the well sampling point, and detecting alcohol passage and return by direct analysis of information about process variables provided by the well instrumentation.

6 Claims, 4 Drawing Sheets

Figure 1:
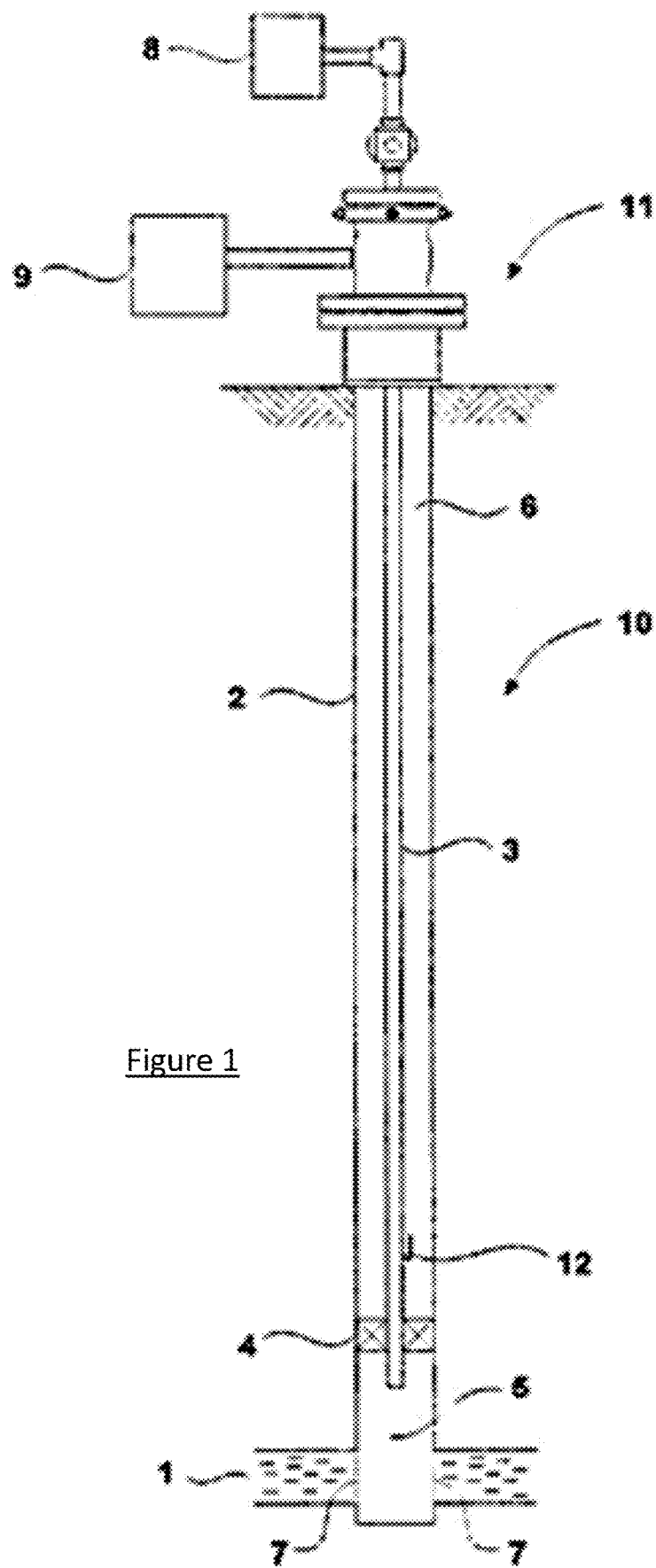

(51) Int. Cl.
*G01M 3/22* (2006.01)
*E21B 47/117* (2012.01)

(56) References Cited

U.S. PATENT DOCUMENTS

| | | | |
|---|---|---|---|
| 5,031,697 | A | 7/1991 | Wellington et al. |
| 5,063,772 | A | 11/1991 | Wellington et al. |
| 10,030,508 | B2 | 7/2018 | Romer et al. |
| 10,914,165 | B2 * | 2/2021 | Pelletier ............ E21B 47/12 |
| 11,313,215 | B2 * | 4/2022 | Yi ...................... E21B 47/107 |
| 2010/0006750 | A1 * | 1/2010 | Zahlsen ............. E21B 47/11 |
| | | | 250/259 |
| 2012/0325464 | A1 * | 12/2012 | Kilaas ................ C09K 8/52 |
| | | | 166/252.6 |

\* cited by examiner

METHOD FOR THE IDENTIFICATION OF OPERATIONAL PROBLEMS IN WELLS THAT PRODUCE BY GAS-LIFT

CROSS-REFERENCE TO RELATED APPLICATIONS

This application is a National Stage entry of International Application No. PCT/BR2020/050543, filed on Dec. 14, 2020, which claims priority to Brazilian Patent Application No. BR 10 2019 027099 3, filed on Dec. 18, 2019. The disclosures of the priority applications are hereby incorporated in their entirety by reference.

FIELD OF THE INVENTION

The present invention addresses to a method for the identification of operational problems based on the hydrodynamic characterization of the gas-lift and production well/lines set, by means of the injection of an alcohol, preferably ethanol, in the gas-lift line. The detection of the passage and return of the alcohol is carried out by the direct analysis of information about the process variables (pressure and temperature at the bottom of the well, at the Christmas tree and at the surface, gas or liquid flowmeters, etc.). Preferably, this detection must also be confirmed by measuring the alcohol concentration at the return, either by sequential collection of samples of the liquid produced by the well and subsequent physicochemical analysis in the laboratory, or by an online meter specially installed for this purpose. Chemical analysis methods for the determination of small amounts of water in alcohol are known from the State of the Art, but the reverse is not found. Thus, procedures for analyzing small amounts of alcohol in water have been specially developed for application together with this invention.

The developed method has application in the technological field of Lifting and Flow of wells that produce oil with the use of gas-lift, whether onshore or offshore wells (in dry or wet completion). It can also be applied in surging oil wells or in gas wells, where there is the possibility of gas injection in the same, by making a temporary gas-lift, and also in other systems where a fluid, particularly a gas, circulates and returns alone or mixed with other fluids, such as in different manifolds, oil or gas wells, wells under rig intervention for completion or workover, etc.

This invention is based on the development of a direct and effective method for determining the gas injection and leak points, which can be applied simply and at low cost in offshore wells, particularly those with wet completion, in addition to the advantage of preferentially using ethanol, a solvent that is less aggressive to the environment and which is available on the platforms, because it is widely used in routine procedures. Accordingly, the platforms already have all the necessary installation and the operators are familiar with the injection of ethanol and all the necessary precautions.

DESCRIPTION OF THE STATE OF THE ART

The continuous gas-lift is a method of artificial lifting of oil, predominantly used in offshore wells due to its reliability and flexibility. In this method, as can be seen in FIG. 1, a high pressure natural gas is injected into the annular space between the casing string and the production string. In some positions along the production string, valves, known as gas-lift valves, are placed, which control the flow of gas that flows from the annular space into the production string. The gas must be continuously injected into a specific gas-lift valve in the string, called the operator valve. However, situations may occur in which there is undue injection of gas in other positions in the string, either by a gas-lift valve that should have been closed and is open (which is conventionally called a "valve giving way"), or by a hole in the string (due to corrosive processes, for example). Another problem that can occur is the appearance of holes or damages in the casing that cause loss of gas to the rock formations crossed by the well.

Traditional solutions to determine the gas injection points in the production string use a direct method, which consists of descending a recorder attached to a steel cable down the well, generating pressure and temperature profiles along its depth. It is an effective method and widely applied in onshore wells, where it is economically viable. However, in dry completion offshore wells, this operation is much more difficult and expensive. In wet completion wells, the use of these recorders is prohibitive, due to the need for intervention with a rig, even if in light workover. Thus, indirect methods using mathematical simulators and some operational maneuvers are adopted; however, with a good margin of uncertainty in the conclusions obtained.

To assess the occurrence of undue gas losses through possible holes in the casing, the descent of recorders in the annular space is not possible and there are some semi-direct methods known in the State of the Art; in general, with the use of acoustic pulses, but which are imprecise and suffer from limitations similar to those already described with the use of recorders.

U.S. Pat. Nos. 4,972,704, 5,031,697, and 5,063,772 describe a method for diagnosing problems in gas-lift wells by injecting a certain volume of gaseous tracer, normally $CO_2$, into the natural gas stream that promotes gas-lift. At the wellhead, a piece of equipment is coupled that performs the automatic and sequential collection of samples of the gas produced by the well and the analysis in real time to determine the concentration of $CO_2$ in the produced gas. Thus, by means of the $CO_2$ concentration profile at the return (shape, time, concentration values, etc.), associated with the well production data and the geometry data thereof, it is possible to infer the position of the injection or leak points and how much gas is being injected or lost at each point.

However, the use of gaseous tracers has some limitations, especially on offshore platforms. One of them is the need to board pressurized cylinders with the tracer and analysis equipment, which is not practical especially in high flow rate wells, which will require appreciable amounts of tracer. The movement of pressurized loads and the coupling of this piece of equipment also represent an operational risk. Another disadvantage is that the analyzer needs electrical energy for its operation, which is not always available on the Platforms and requires caution, as the equipment is placed in a classified area; that is, with risk of explosion, among others. The boarding of a specialized team due to the operation also increases costs, and accommodation spaces on the platform are often disputed with other service priorities. Furthermore, in wells with a high content of $CO_2$ in the produced gas, as in the case of the Brazilian Pre-Salt, the use of this tracer is unfeasible. Other gaseous tracers, however, are much more expensive and difficult to detect, or have highly undesirable characteristics, such as aggressiveness/toxicity to humans and the environment.

To solve the inconveniences of using gaseous tracers, patent PI 0804625-5 proposes a method in which a tracer is soluble in water and in alcohol. Normally, a fluorescent compound, such as uranine, is dissolved in alcohol (usually ethanol) on the platform, and a certain volume of the resulting alcohol-tracer solution is injected into the gas-lift stream of the well being studied. Although the tracer is miscible in alcohol, when entering the production string, it enters into solution in the water produced by the well, since this tracer is also chosen so that its partition in water is almost 100% in an oil-water system (the alcohol, in turn, is totally miscible in water). Produced water samples are sequentially collected using the usual collection point on the platform for different samples of fluids produced by the well. Thus, having the well production data (oil, water and gas flow rates), the well geometry data and other relevant parameters, and the tracer concentration profile in the produced water, it is possible, through some calculations, to determine the gas injection or leak points in a similar way to what would be done with the gas tracer.

Although it solves some inconveniences of the use of gaseous tracers, the solution proposed in the patent PI 0804625-5 also has important limitations. The first one is that it requires mixing the tracer in alcohol. Since alcohol is a flammable product, it is not possible to use individual canisters to solubilize the tracer before its injection and, therefore, the compound needs to be dissolved in the alcohol tank that serves the platform as a whole. As this tank normally has a large volume, it may be difficult to homogenize the solution. A much larger amount of tracer than is needed for a specific well will end up being used, and the alcohol-tracer solution will also end up being injected into other wells, serving the usual purposes of alcohol. A large volume of tracer in discarded produced water can cause eventual staining which, although it is short-lived and harmless to humans and the environment, is not convenient. Another serious inconvenience is that, in many cases, the alcohol in its trajectory accompanying the gas may go through very high temperatures, resulting in its evaporation, and the tracer (which, in isolation, is solid) will come out of solution, depositing itself along the way. In a more extreme situation, this tracer ends up being deposited at critical points, such as inside a gas-lift valve, which can be harmful. The sample collection process, although much simpler, practical and convenient than in the case of using the gas tracer, is laborious and the samples have to be sent to the laboratory for analysis. In addition, there is a certain loss of ethanol in the samples by evaporation along the way, which can, in case of excessive delay in sending the sample to the laboratory, result in underestimated concentration readings.

The need for sample collection and analysis in the laboratory makes the response to the operation performed take a certain time, reducing its efficiency, as it is often important to obtain the diagnosis of the well as quickly as possible, in order to not delay any corrective measures. Further, as the return time of the tracer is not known a priori, but estimated by simulation involving some assumptions and a certain degree of uncertainty, there is a need to collect samples for a long period, making the operation time-consuming and laborious. It is also possible that the result of the analysis of the samples ends up revealing that the collection time was insufficient, forcing the repetition of the operation. Thus, the ideal is to have a method that provides answers in real time.

Finally, the method of patent PI 0804625-5 cannot be used in wells that do not produce water together with oil, since it is based on the tracer solubilization in the produced water that will be collected at the return. Although uncommon, this situation occurs in wells in the initial stage of production, such as the Pre-Salt. In the absence of water, the tracer to be used would have to be soluble in hydrocarbons and alcohol, which is rare to find, as the few known substances are extremely aggressive to humans and the environment.

Thus, the method presented in patent PI 0804625-5, although it has advantages and can be applied in certain cases with effective results, still has drawbacks that the invention described here solves.

Document U.S. Pat. No. 10,030,508 discloses a method for assessing the gas injection or leak points in a production well containing an annular space between a production string and a surrounding casing string(s). The method basically consists of determining the composition of the fluids produced by the well and injecting one or more tracer compounds via gas-lift, namely: Ar, $N_2$, $O_2$, $SF_6$, He, Xe, or combinations thereof. Each of the chosen tracers consists of a substance not native to the production fluids, and each has a different rate of diffusivity in the gas-lift. Tracer materials are detected as they are produced on the surface. For this, a mass spectrometer or other analyzer capable of detecting gaseous tracer compounds at concentrations lower than 1,000 ppm is used. With this, it is possible to determine the injection points of one or more tracers and verify that each of these injection points represents a gas-lift valve along the production pipeline. However, the method described in document U.S. Pat. No. 10,030,508 has essentially the same limitations as mentioned above when discussing the methods described in patents U.S. Pat. Nos. 4,972,704, 5,031,697, and 5,063,772, which use $CO_2$.

Accordingly, there is a need of using a direct and effective method for the determination of gas injection and leak points that can be applied simply and at low cost in offshore wells, particularly those with wet completion.

On offshore platforms, alcohols are usually available because they are widely used in routine operational procedures, such as inhibiting the formation of gas hydrates in gas-lift lines. In general, the alcohols normally used on platforms are methanol, ethanol and MEG (monoethylene glycol), but the most recommended for the application of the present invention is ethanol, widely adopted on offshore platforms in Brazil.

In the method proposed in this invention, no tracer substance is used; thus, there is no need to board any additional chemicals on the platform and, consequently, no manipulation is required. The fact that it is also not necessary to dissolve any substance in the ethanol tank simplifies the operation, increases safety, and leaves no "denatured" ethanol inventory to be used in other operations, eliminating any operational risk that may eventually occur as a result. As ethanol is commonly used, the platforms already have all the necessary installations, including tanks, tubes, manifolds, injection pumps, etc. Furthermore, the operators are familiar with ethanol injection and with all the necessary precautions associated with this type of operation.

Another advantage of the method of the present invention is that alcohol can go through different pressure and temperature conditions on its way, even changing its physical state (liquid to vapor, for example) without this posing any risk or problem, since no products are added to the same.

Another important feature is that alcohol, when in contact with water, in the proper proportion, promotes sensitive changes in certain properties of this substance. For example, the alcohol-water mixture is exothermic. This heat generation causes an increase in the temperature of the water and the produced fluid. Although the increment is small, it is enough to be detected in the temperature sensors that are in the Christmas tree, in wells of dry or wet completion. In the latter case, the temperature increase can be sensed even by the sensor located at the arrival of the produced fluid to the platform, as long as the length of the production line (flowline+riser) is not so great that the fluid enters into thermal equilibrium with the sea.

Another property of water that alcohol alters is surface tension. This ends up interfering with the two-phase flow, due to changes related to the size and shape of bubbles, slippage, phase arrangement transitions, etc. This disturbance can be sensed by the pressure sensors (with consequences in some cases on the temperature due to the change in flow rate). Another change caused by the dissolution of alcohol in water is the destabilization of water-oil emulsions, with the consequent change in the viscosity of the produced fluid. Alcohol also causes changes in the flow in the gas-lift line and in the annulus of the well, because where before it used to flow a practically dry gas, it starts to flow a gas with liquid in a pattern that is likely to be a mist. Although it is also a small disturbance, it can be sensed in terms of gas flow rate, platform injection pressure, and well annulus pressure.

Finally, the combination of the various process signals can mark the passage of alcohol in the notable points of the system. Thus, this passage can be detected even without sample collection. Depending on the specific case, the operational diagnosis can be performed with the simple injection of an alcohol cushion, without sample collection, or an initial injection can be performed just to precisely define the alcohol return time window and, thus, optimizing the collection of samples, greatly simplifying the operation. This reduces the size of the team on board to carry out the tests or even eliminates it, with the collection of samples being carried out by the routine operators. In addition, as the collection time is reduced, operations can be carried out on a greater number of wells in the same period of time.

The presence of alcohol in petroleum, if any, is always in tiny amounts that do not interfere with the analysis and, thus, the product can be used in any type of well; such as, for example, the Pre-Salt, which produce a lot of gas and contain a lot of $CO_2$, making it impossible to use $CO_2$ as a tracer. Alcohol can also be used in wells that produce little or no water, as it will likely end up in solution in the oil. In this case, chemical analysis must be carried out on samples collected from the oil.

By carrying out tests in wells, a collection procedure was also developed that is part of this invention. In the method in question, samples of the produced liquid are collected at the usual sampling point of each well. The liquid is collected in plastic bags. If necessary, a few drops of demulsifier are added to highlight the presence of free water. The bag is then punctured at the bottom and a collection flask filled. An important point of the procedure is to leave a small amount of oil present in the flask, which will form a seal on the surface, preventing the loss of alcohol by evaporation.

Another relevant feature of the invention refers to the method of analysis of the collected samples. Methods for quantifying water in alcohol are well known in the State of the Art, but the reverse is not. Thus, two analytical techniques were successfully implemented: (1) Nuclear Magnetic Resonance (NMR), where signals characteristic of ethanol, and distinct from the other components, can be observed, even in small concentrations and (2) Determination of Physicochemical Properties (specific mass, viscosity, refractive index, electrical conductivity, etc.), since such properties are altered by the presence of alcohol in the produced water. In case (2), the most practical property to evaluate and which showed accurate results was the specific mass. It was found that, for small amounts of alcohol in water, there is a strongly linear relationship between the specific mass and the alcohol concentration. For an accurate calibration of the method of analysis, samples of the alcohol to be injected and the water produced by the well (without alcohol) must be collected and their specific masses obtained. Depending on the property to be measured, it will be possible to carry out the analyses on the platform itself, reducing the response time. In addition, an online meter can be configured to be connected to the sampling point and take readings in real time.

In this way, tests for the diagnosis of operational problems in a well with gas-lift injection, of dry or wet completion, can be performed in many cases only by injecting the alcohol already available on the platform and monitoring its return in real time, by means of the signals of the process variables. Additionally, sample collections can be performed to improve the quality of the response, particularly in terms of mass balance. Collections must follow the procedure described in this invention and analyses must preferably be performed by the methods also reported in the invention. The possibility of evaluating the concentration of alcohol online is further considered; that is, in real time using, for example, a method for determining the physicochemical properties of the solutions.

The method described in this invention is applicable in the identification of operational problems in oil wells that produce by gas-lift, whether onshore or offshore, of dry or wet completion.

The method of the present invention can also be applied in surging oil wells, or in gas wells, where there is the possibility of gas injection, by making a temporary gas-lift.

Furthermore, with adaptations, the method can be adopted in other systems where a fluid, particularly a gas, circulates and returns alone or mixed with other fluids. Alcohol can be injected at a point in the system and its return monitored, obtaining information on the trajectory and distribution of the various fluids. Examples of these systems are various manifolds, oil or gas wells producing oil using hydraulic pumps, wells that receive chemical injection, wells under rig intervention for completion or workover, etc.

No document of the State of the Art discloses a method for identifying operational problems in wells that produce by gas-lift such as this one of the present invention.

BRIEF DESCRIPTION OF THE INVENTION

The present invention addresses to a method for the identification of operational problems based on the hydrodynamic characterization of the gas-lift and production well/lines set, by means of the injection of an alcohol, preferably ethanol, in the gas-lift line. The detection of the passage and return of alcohol is carried out by the direct analysis of information about the process variables (pressure and temperature at the bottom of the well, at the Christmas tree and at the surface, gas or liquid flowmeters, etc.). Preferably, this detection must also be confirmed by measuring the alcohol concentration at the return, either by sequential collection of samples of the liquid produced by the well and subsequent physicochemical analysis in the laboratory, or by an online meter specially installed for this purpose. Chemical analysis methods for the determination of small amounts of water in alcohol are known from the state of the art, but the reverse is not found. Thus, procedures for analyzing small amounts of alcohol in water have been specially developed for application together with this invention.

Figure 2:
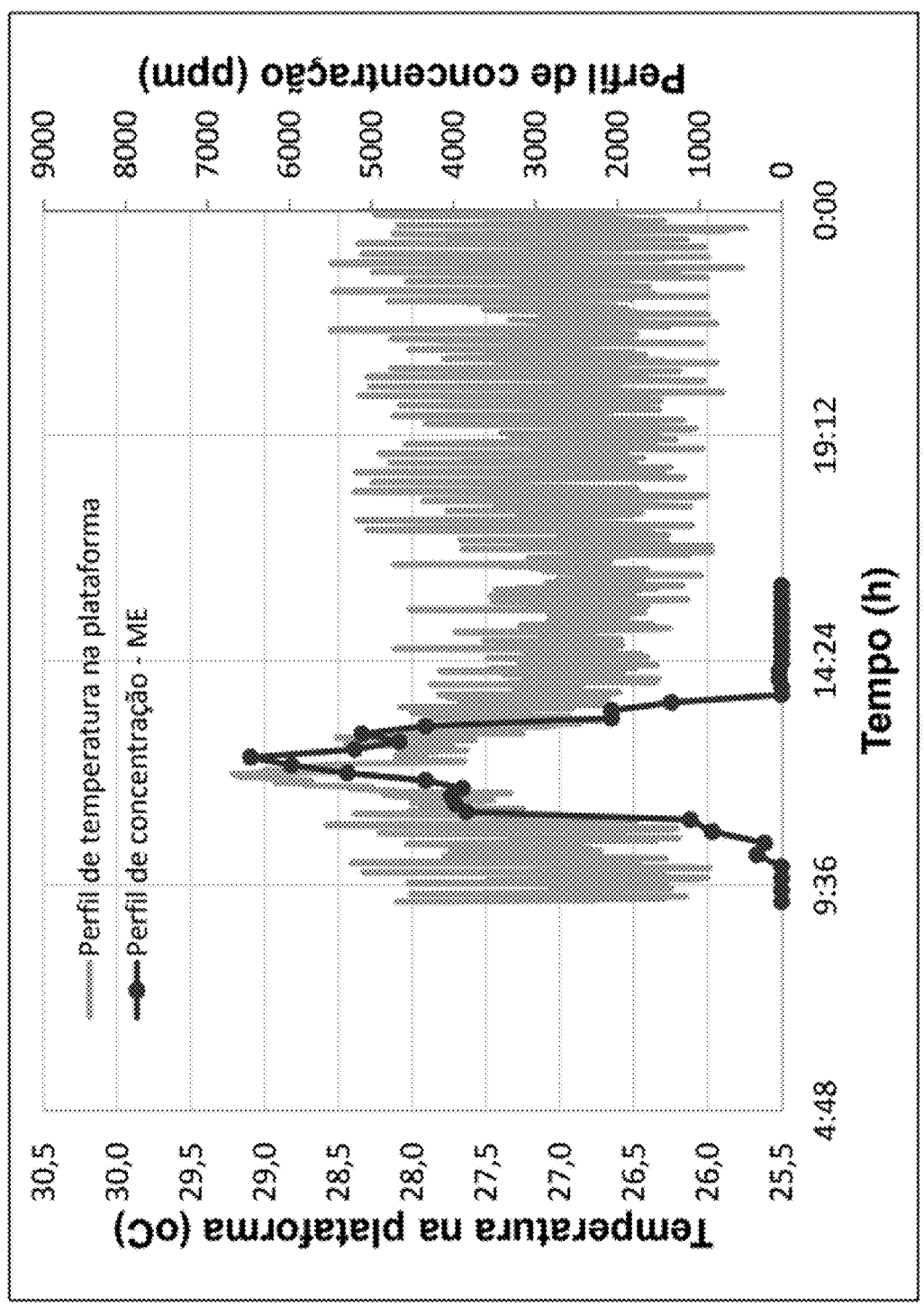
Figure 3:
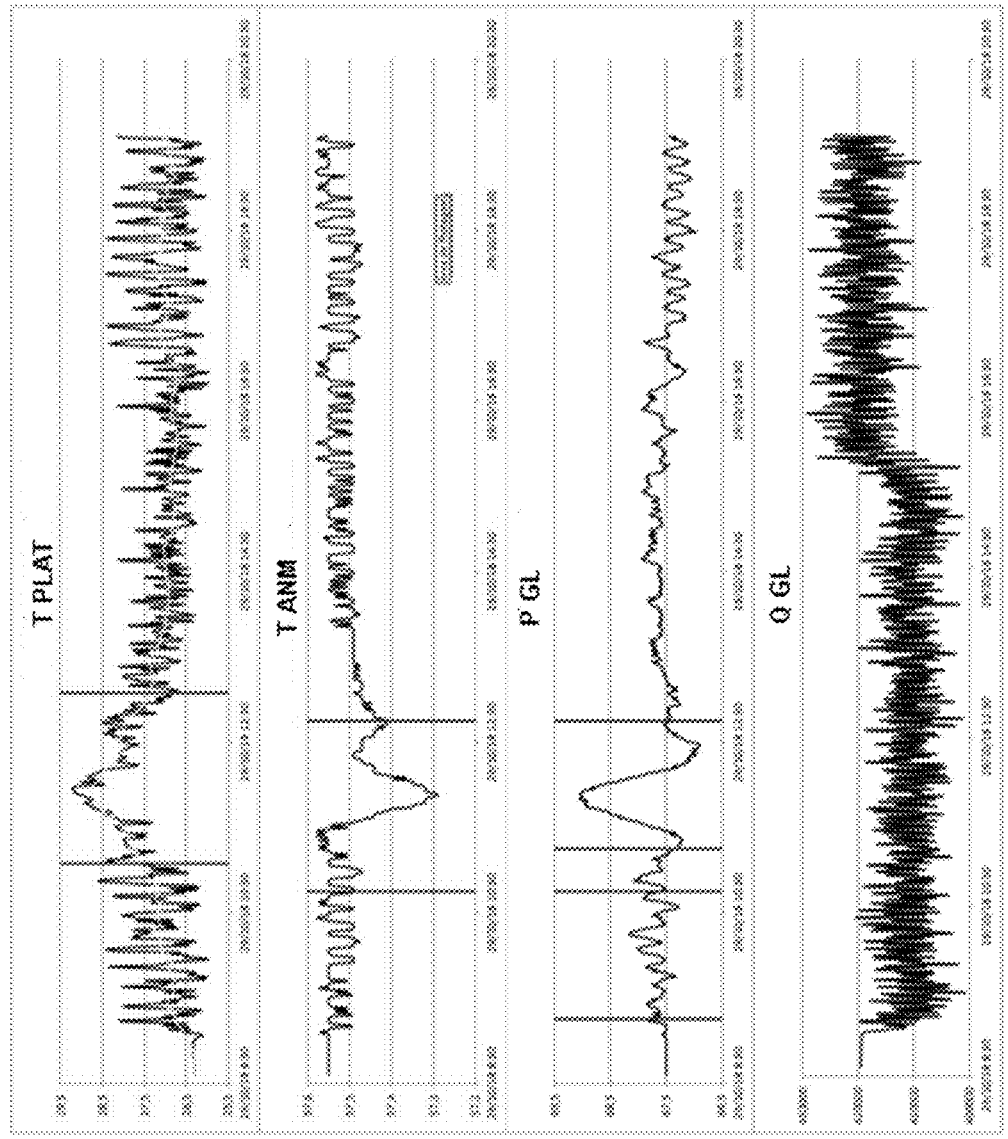
Figure 4:
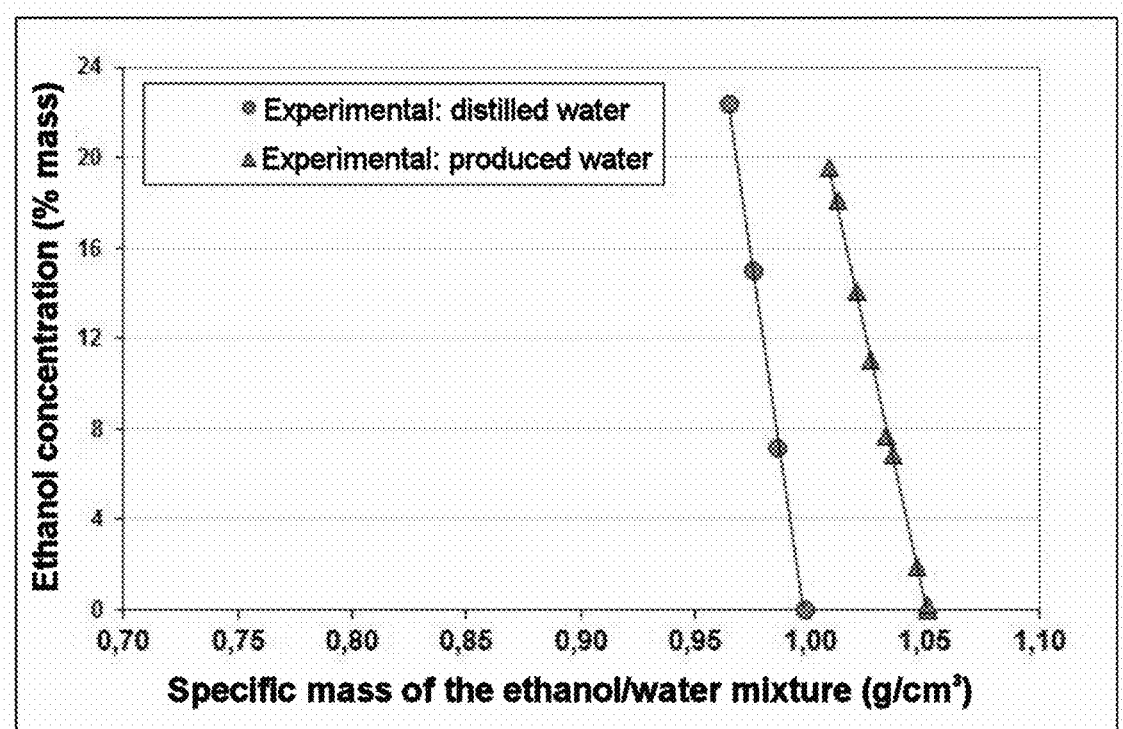

This invention will be described in more detail below, with reference to the attached figures which, in a schematic form and not limiting the inventive scope, represent examples of its embodiment. In the drawings, there are:

FIG. 1 illustrating a schematic of a well equipped for a gas-lift;

FIG. 2 illustrating the temperature profile at the arrival on the platform at for a wet completion offshore well and the alcohol concentration profile obtained by the specific mass method;

FIG. 3 illustrating profiles of some process variables for a wet completion offshore well, where an ethanol injection operation was carried out in the gas-lift;

FIG. 4 illustrating the variation of the ethanol mass fraction in relation to the specific mass of the ethanol mixture in distilled water and in water produced by the well, in a range of low concentration of ethanol, at 20° C.

DETAILED DESCRIPTION OF THE INVENTION

The present invention discloses a method for the identification of operational problems in wells that produce by gas-lift, by means of the injection of an alcohol, preferably ethanol, in the gas-lift line. The detection of the injection and the return of alcohol is performed by the direct analysis of information about the process variables (pressure and temperature, mainly) provided by the well instrumentation. This detection must also be confirmed by measuring the concentration of alcohol in the liquid produced at the return, either by sequential sample collection and subsequent physicochemical analysis in the laboratory, or by an online meter specially installed for this purpose. Procedures for analyzing small amounts of alcohol in water have been specially developed for application together with this invention.

As can be seen schematically in FIG. 1, the system of a well equipped for gas-lift consists of: reservoir (1), casing string (2), production string (3), packer (4), chamber below the packer (5), annular space (6), perforated area (7), collection point (8), gas source (9), well (10), Christmas tree (11), gas-lift valve (12). In a common configuration for this method, high pressure natural gas from a source, usually a compressor (9), is conducted to the Christmas tree (11), usually through a pipe or gas-lift line, and injected into the annular space (6) formed between the casing string (2) and the pipeline or production string (3) through which the production of fluids from the reservoir (1) flows. In some positions along the production pipeline, valves, known as gas-lift valves (12), are placed, which control the flow of gas from the annular space (6) into the production string (3). The expansion of the pressurized gas and the consequent reduction in the apparent density of the multiphase mixture allow the flow of fluids from the reservoir (1) to be possible at a determined flow rate. The mixture of fluids from the reservoir with the gas from the gas-lift arrives at the collection point (8), which is a platform or production station, generally through a pipeline or production line.

There are several types of gas-lift valves (12). In general, some of the valves along the pipeline are used (i.e., they only open) in case the well is unloaded after intervention with a rig or in the eventual need to resume production, after an accidental shutdown or a preventive stop of the production of the well. These are called dump (or start-up) valves. Normally, in the daily operation of the well, the injection takes place through only one gas-lift valve (12), usually the deepest one, which is then called the operator valve. There are situations, as seen in FIG. 1, in which only a single gas-lift valve (12) is used, which plays the role of operator and discharge valve.

The objective of the method of this invention is to diagnose if the gas is being injected only in the operator valve (12), or if there are other improper injection points. The method also seeks to investigate whether there is gas escaping from the annulus (6) to the rock formations crossed by the well or not.

The method developed in this invention for the identification of operational problems in gas-lift wells comprises the following steps for application in a specific well:

Before the Diagnostic Test a) Define the objectives of the diagnostic test with the client;
b) Collect relevant system information (geometry, fluid properties, fluid flow rates, etc.). Analyze the files and reports of routine well simulations in computer simulators at the client's choice;
c) Carry out additional simulations, as necessary, and estimate the passage times of alcohol along the different sections of the system;
d) Define the alcohol flow rate (and the maximum concentration at the return, therefore), taking into account the objective of the diagnostic test, the detection levels of the technique used for alcohol analysis, and the operational limitations of the platform in question;
e) Set the alcohol injection time. Also analyze whether there is interference from other chemicals and their solvents that are eventually regularly injected into the well or not;
f) Define practical aspects of the diagnostic test with the various actors involved, in particular those who work directly in the operation of the platform. Define logistics aspects, sample collection points or online meter coupling point, onboard resources, necessary maneuvers, etc.

During the Diagnostic Test g) Apply regularly used alcohol from the platform tank;
h) Adjust and calibrate the flow rate of the platform metering pump(s) to the required value. Maintain the alcohol injection for the required injection time;
i) Taking into account the expected return time of the alcohol front and the injection time, define the total time of the diagnostic test, adding a safety margin;
j) Preferably, align the well during the diagnostic test period to the test separator with fiscal measurement (that is, put the well in production test), for correct flow measurement. The injection of alcohol must only be performed after the stabilization of the well in the test separator. This improves the accuracy of interpretation of diagnostic test results, particularly with respect to mass balance. However, if this is not possible, the operation can be carried out with the well aligned normally for the production separator, by scheduling a production test of the well as soon as possible. Also check if the information of the process variables of interest are being acquired normally in the supervisory system;
k) The point of collection of oil and water samples must be the same manifold that already exists for collection of samples, due to the ease of access. Even with the use of an online meter, or using only the signals of the process variables for detection, samples must be collected at adequate time intervals. Without the online meter or the variable signals, or even for a more thorough test, the sampling interval can be reduced to the practical minimum possible. Also collect samples of alcohol and other chemicals that may be eventually used;

l) Use the most appropriate sample collection procedure for a specific case. For example, production fluids (water and oil) can be collected directly in plastic bags, preferably with a volumetric capacity of 2 L. To speed up the operation, one or more drops of demulsifier can be added. After a certain waiting time, each bag is punctured at its base with a special needle, the first jet is discarded, and, next, a sample flask is filled with water. Allow the sample to contain a certain amount of oil, because it promotes the formation of an oil seal on the surface, which helps to preserve the alcohol against evaporation, particularly if the samples cannot be analyzed on the platform itself, having to be transported to the shore. Cap the flask and label it correctly for future reference. Forward all collected samples to the laboratory on the platform or on shore for chemical analysis.

After the Diagnostic Test m) Analyze the produced water samples using the appropriate method. In addition to NMR, an analysis method based on physicochemical properties, particularly specific mass, can be used. In this case, a calibration curve must be constructed, preferably using a sample of the water produced by the well. Analyze the other collected samples (from the injected alcohol, for example);

n) With the results of alcohol concentration at the return (concentration profile), of the online meter (if any), and of the signals of the process variables, define the passage times of the alcohol in the system and the mass balance, in order to determine the positions of the gas injection points in the system and the eventual occurrence of a gas leak. Employ computer simulation of the transient flow of alcohol in the system to improve the quality of diagnosis;

o) Discuss the results with the client and issue a specific diagnostic test report.

FIG. 2 shows the temperature profile at the arrival on the platform for a wet completion offshore well and the alcohol concentration profile obtained by the specific mass method. The coincidence between the profiles confirms the return of ethanol to the platform.

FIG. 3 presents the profiles of some process variables for a wet completion offshore well, in which an ethanol injection operation was performed in the gas-lift. From top to bottom, there are shown the profiles of the temperature of the produced fluid at the arrival on the platform ("T PLAT"), the temperature of this fluid in the wet Christmas tree ("T WCT"), the pressure downstream the gas-lift choke valve ("GL P"), and gas-lift flow rate ("GL FR"). The vertical bars with dotted lines define the observed or expected time interval for the passage of the ethanol cushion at that specific point (Christmas tree or platform) and the vertical bars with a dash-dot line indicate the time interval of ethanol injection. Therefore, it can be verified that the passage of ethanol is recorded by the process signals.

In FIG. 4, there is shown the variation of the mass fraction of ethanol in relation to the specific mass of the ethanol mixture in distilled water and in produced water, in a range of low concentration of ethanol at 20° C. It is observed that, for the concentration range of interest of ethanol, the relationship is linear and very precise. However, the calibration curve must be made with the water produced by the well.

Other physicochemical parameters can be used, such as viscosity, refractive index, electrical conductivity, etc.

EXAMPLES

So far, five applications of the method have been carried out in offshore gas-lift wells, the first in a dry completion well and the others in wet completion wells:

Example 1

In this application, the method was used to determine the gas injection point in a dry completion well. The return of alcohol was recorded and a conclusion regarding the well status was issued, indicating simultaneous injection through two gas-lift valves.

Example 2

In this case, the method was applied in a well with gas-lift and production lines of 4 km in length and with gas injection by the WCT (X-O). The objective was to calibrate and improve the method. The return of alcohol was very clear, complete, and compatible with the time estimated by simulation. The signals of the process variables confirmed the passage of alcohol.

Example 3

The third application was made in a well with very long lines (12 km), being an extreme test for said invention. No return of alcohol was recorded during the monitored time period. This well normally receives gas from a manifold and was specially aligned for a service line that was used by another well. There is no evidence whether the reason for not having recorded the return of alcohol is related to this or not.

Examples 4 and 5

These applications were carried out in two wet completion wells that produce by gas-lift with 2 km lines, to calibrate the method in one case and identify a possible hole in the string in the other case. In the first case, the injection in the deepest gas-lift valve was identified, with no evidence of a hole or gas leak. In the second case, a probable hole was identified in the production string in the shallowest third of the well.

Although ethanol is the preferred alcohol for application in this invention, another type of alcohol can be used, such as methanol and MEG, without significant changes in the procedures. If the chosen alcohol is not available on board, it can be boarded. Also, more than one type of alcohol can be injected, simultaneously or in sequence, to improve operational diagnosis.

If any process variable relevant to the interpretation of the alcohol injection operation is not being regularly monitored, due to a sensor failure, for example, digital portable equipment for the measurement and acquisition of data can be boarded to be used during the operation.

Although an operational diagnostic procedure, such as alcohol injection, is normally performed only when a problem is suspected in the well, it is recommended to perform at least one alcohol injection operation during the normal operation of the well to serve as a reference, which helps in the differential diagnosis of the operation performed with the well already presenting an operational problem.

The detection of holes in the string or casing is of utmost importance to guarantee the integrity of the wells. Periodic investigation of wells can lead to early diagnosis of problems, before they become more serious, requiring immediate intervention.

Ethanol (the alcohol most suitable for use in this invention), at its return, when diluted, is not toxic to humans or the environment, presenting no known risks to people, the environment or the process.

Alcohol is a product routinely used on platforms for eventual or permanent injection in the gas-lift. There are already facilities prepared for its application, established procedures, and the operators are already familiar with this type of injection. There is, therefore, no safety risk in addition to that normally encountered in an industrial installation of this type.

The conventional test, with a run of pressure and temperature profiles, has operational limitations, since there is an insertion of a tool inside the well and, in the case of wet completion wells, it requires the coupling of an intervention vessel to the well. This test also has considerable risks of oil leakage to the platform or the sea. Such risks do not exist in the present invention.

Regarding the reliability of the production control, the method of the present invention can confirm the indirect analyses performed in the simulations, increasing confidence in the actions to be implemented to solve the problems and optimize production.

The method of the present invention is conceptually simple and its operational application is also relatively simple, which, with a little more systematization and training, can be performed, in whole or in part, by the platform own operational team, whenever necessary, streamlining greatly in the process of diagnosing operational problems.

A test by the conventional method of direct diagnosis in gas-lift offshore wells costs from a few hundred to a few million reais, depending on whether the well is of dry or wet completion. In turn, testing by the method of this invention has a much lower cost. The diagnostic result can lead to more accurate operational decisions, saving resources, reducing costs and increasing the revenue, with values that can even be much more expressive than the simple savings previously reported in relation to the cost of conventional testing.

It should be noted that, although the present invention has been described in relation to the procedure referring to a test in an offshore well of dry or wet completion, operating with gas-lift and with dedicated lines, it may undergo modifications and adaptations for other situations of onshore or offshore wells in different arrangements, such as configurations with gas injection or production with manifolds or rings, depending on the specific situation, but provided that within the inventive scope defined herein.

The invention claimed is:

1. A method for the identification of operational problems in wells that produce by gas-lift, comprising:
    allowing a hydrodynamic evaluation of a well/lines set by injection of at least one alcohol in a gas-lift line;
    collecting samples at a well sampling point; and
    detecting alcohol passage and return by direct analysis of information about process variables provided by well instrumentation,
    wherein the injected at least one alcohol is ethanol.

2. The method for the identification of operational problems in wells that produce by gas-lift according to claim 1, wherein detection of injection and gas leak points is confirmed by measuring a concentration of the at least one alcohol at a return, either by a sequential collection of samples of a liquid produced by the well and subsequent physicochemical analysis in the laboratory, or by an online meter.

3. A method for the identification of operational problems in wells that produce by gas-lift, comprising:
    allowing a hydrodynamic evaluation of a well/lines set by injection of at least one alcohol in a gas-lift line;
    collecting samples at a well sampling point; and
    detecting alcohol passage and return by direct analysis of information about process variables provided by well instrumentation,
    wherein a collection of samples is gathered directly in plastic bags by adding one or more drops of demulsifier, and after a waiting time, piercing each bag at its base with a needle, a first jet being discarded and, next, a sample flask being filled, leaving an amount of supernatant oil to avoid ethanol evaporation.

4. A method for the identification of operational problems in wells that produce by gas-lift, comprising:
    allowing a hydrodynamic evaluation of a well/lines set by injection of at least one alcohol in a gas-lift line;
    collecting samples at a well sampling point;
    detecting alcohol passage and return by direct analysis of information about process variables provided by well instrumentation; and
    analyzing water samples produced with alcohol by Nuclear Magnetic Resonance (NMR) or based on physicochemical properties.

5. The method for the identification of operational problems in wells that produce by gas-lift according to claim 3, wherein the plastic bags comprise 2 Liter (L) bags.

6. The method for the identification of operational problems in wells that produce by gas-lift according to claim 4, wherein the physicochemical properties include at least one of specific mass, refractive index, and electrical conductivity.

* * * * *